US010368407B2

(12) United States Patent
Luccato

(10) Patent No.: US 10,368,407 B2
(45) Date of Patent: Jul. 30, 2019

(54) ELECTRONIC CONVERTER AND RELATED LIGHTING SYSTEM

(71) Applicant: Osram GmbH, Munich (DE)

(72) Inventor: Daniele Luccato, Vittorio Veneto (IT)

(73) Assignee: OSRAM GMBH, Munich (DE)

( * ) Notice: Subject to any disclaimer, the term of this patent is extended or adjusted under 35 U.S.C. 154(b) by 0 days.

(21) Appl. No.: 15/970,947

(22) Filed: May 4, 2018

(65) Prior Publication Data
US 2018/0324915 A1  Nov. 8, 2018

(30) Foreign Application Priority Data

May 4, 2017  (IT) .................. 102017000048409

(51) Int. Cl.
*H05B 33/08*  (2006.01)
*H05B 37/02*  (2006.01)
*H02M 3/335*  (2006.01)

(52) U.S. Cl.
CPC .... *H05B 33/0818* (2013.01); *H02M 3/33523* (2013.01); *H02M 3/33553* (2013.01); *H05B 33/0845* (2013.01); *H05B 33/0857* (2013.01); *H05B 37/0218* (2013.01)

(58) Field of Classification Search
CPC .............. H05B 33/08; H05B 33/0809; H05B 33/0815; H05B 33/0818; H05B 33/0845; H05B 33/0851; H05B 33/0869; H05B 37/02; H02M 3/335; H02M 3/33515; H02M 3/33523; H02M 3/33553
See application file for complete search history.

(56) References Cited

U.S. PATENT DOCUMENTS

| | | | | |
|---|---|---|---|---|
| 2014/0098578 A1* | 4/2014 | Halberstadt | ....... | H02M 3/33515 363/21.15 |
| 2014/0192563 A1* | 7/2014 | Lin | .................... | H02M 3/33523 363/21.13 |
| 2015/0015156 A1 | 1/2015 | Angelin et al. | | |
| 2015/0323588 A1 | 11/2015 | Peng et al. | | |
| 2016/0373014 A1* | 12/2016 | Pflaum | .............. | H02M 3/33523 |

FOREIGN PATENT DOCUMENTS

| | | |
|---|---|---|
| DE | 102015107256 A1 | 11/2015 |
| DE | 102015109692 A1 | 12/2016 |
| WO | 2009128025 A1 | 10/2009 |
| WO | 2017060813 A1 | 4/2017 |

OTHER PUBLICATIONS

Italian Search Report based on application No. 102017000048409 (8 pages) dated Dec. 11, 2017 (Reference Purpose Only).

* cited by examiner

*Primary Examiner* — Thai Pham
(74) *Attorney, Agent, or Firm* — Viering Jentschura & Partner MBB

(57) ABSTRACT

Herein is disclosed an electronic converter, including a measurement circuit for determining a first signal indicative of the voltage or current supplied by the electronic converter, a regulation circuit for generating a regulation signal as a function of the first signal and one or more reference signals, and a driver circuit for driving the switching stage of the electronic converter as a function of the regulation signal.

17 Claims, 10 Drawing Sheets

ELECTRONIC CONVERTER AND RELATED LIGHTING SYSTEM

CROSS-REFERENCE TO RELATED APPLICATION

This application claims priority to Italian Patent Application No. IT102017000048409, which was filed on May 4, 2017, and which is hereby incorporated herein by reference in its entirety.

TECHNICAL FIELD

The description relates to lighting systems.

BRIEF SUMMARY

Herein is disclosed an electronic converter, including a measurement circuit for determining a first signal indicative of the voltage or current supplied by the electronic converter, a regulation circuit for generating a regulation signal as a function of the first signal and one or more reference signals, and a driver circuit for driving the switching stage of the electronic converter as a function of the regulation signal.

DETAILED DESCRIPTION

Figure 1:
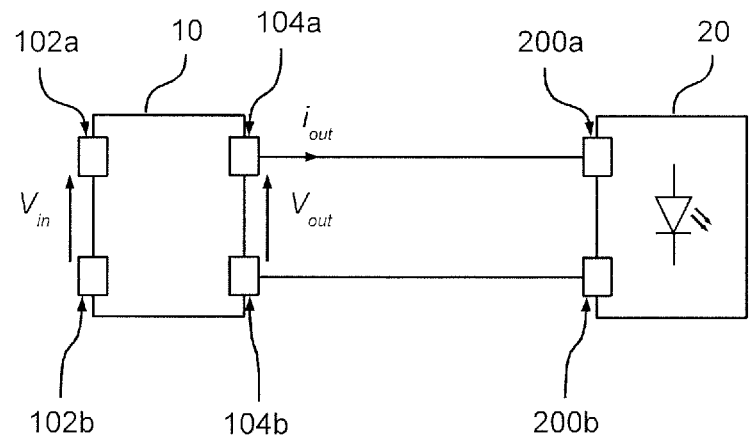
FIG. 1 shows a lighting system including an electronic converter and at least one lighting module.

In the following description, various specific details are given to provide a thorough understanding of the embodiments. The embodiments may be practiced without one or several specific details, or with other methods, components, materials, etc. In other instances, well-known structures, materials or operations are not shown or described in detail in order to avoid obscuring various aspects of the embodiments.

Reference throughout this specification to "one embodiment" or "an embodiment" means that a particular feature, structure, or characteristic described in connection with the embodiment is included in at least one embodiment. Thus, the possible appearances of phrases such as "in one embodiment" or "in an embodiment" in various places throughout this specification are not necessarily all referring to the same embodiment. Furthermore, particular features, structures, or characteristics may be combined in any suitable manner in one or more embodiments.

The headings provided herein are for convenience only, and therefore do not interpret the extent of protection or scope of the embodiments.

Various embodiments concern solutions for transmitting one or more signals in addition to a main feedback signal from the secondary side to the primary side in an electronic converter.

In various embodiments, the electronic converter includes two input terminals for receiving an input voltage, and two output terminals for providing a direct voltage or a direct current.

In various embodiments, the electronic converter includes a transformer and a switching stage, configured to selectively transfer power from the input terminals to the primary winding of the transformer. A rectifier and filter circuit is connected between the secondary winding of the transformer and the output terminals.

In various embodiments, in order to regulate the output voltage or current, the electronic converter includes a measurement circuit, configured to determine a first signal indicative of the voltage or of the current supplied through the output terminals. A regulation circuit generates a regulation signal as a function of the first signal and one or more reference signals, and a driver circuit drives the switching stage as a function of the regulation signal. For example, the regulation circuit may be a PI or PID regulator, a comparator with hysteresis, or a comparison circuit including two comparators configured for comparing the first signal with a lower threshold and an upper threshold.

In various embodiments, in order to transmit the first signal and at least one second signal, the electronic converter includes an optical, inductive or capacitive coupler, a transmission circuit and a receiver circuit. For example, the second signal may be provided by a sensor configured to detect the kind and/or the operating status of a lighting module, a light sensor configured to detect the light in the environment, and/or the brightness and/or the color of the light emitted by the lighting module, a temperature sensor configured for detecting the temperature of the electronic converter and/or of the lighting module, and/or a sensor of other environmental data, e.g. the ambient temperature.

In various embodiments, the transmission circuit is configured to receive the first signal and the second signal. Subsequently, the transmission signal generates a bit sequence indicative of the second signal, and generates an encoded bit sequence by applying a Manchester encoding to the bit sequence.

In various embodiments, the transmission circuit generates a pulse width modulated signal applied to the input of the optical, inductive or capacitive coupler. Specifically, the pulse width modulated signal includes, for each bit of the encoded bit sequence, a sequence of a first number of pulses having a first frequency, if the respective bit has a first logical value, and a sequence of a second number of pulses having a second frequency, if the respective bit has a second logical value. For example, in various embodiments, the first sequence includes a single pulse having the first frequency and the second sequence includes two or more pulses having the second frequency. In various embodiments, the second frequency is a multiple of the first sequence, preferably twice the first frequency.

Moreover, in various embodiments, the transmission circuit varies the duty cycle of the pulse width modulated signal as a function of the first signal.

For example, in various embodiments, the transmission signal includes an oscillation circuit, configured to generate a triangular or sawtooth-shaped signal, having the first or the second frequency as a function of the bits of the encoded bit sequence, and an analog comparator configured to generate the pulse width modulated signal by comparing the first signal with the triangular or sawtooth-shaped signal.

For example, in various embodiments, the oscillation circuit includes a digital circuit, which provides two signals. The first signal includes, in sequence, the bits of the encoded bit sequence, and the second signal includes square wave pulses. Specifically, the second signal includes the first number of pulses having the first frequency if the current encoded bit has the first logical value, and the second number of pulses having the second frequency if the current encoded bit has the second logical value.

In various embodiments, the oscillation circuit moreover includes an RC filter, including at least one resistor and at least one capacitor, wherein the charging time of the at least one capacitor varies as a function of the value of the current encoded bit. For example, the RC filter may include a first capacitor and a second capacitor, which are selectively connectable in parallel with the first capacitor as a function of the value of the current bit of the encoded bit sequence.

Therefore, the voltage at the capacitor corresponds to a triangular signal. On the other hand, in order to generate a sawtooth-shaped signal, the oscillation circuit may include a diode connected in parallel with the resistor, so as to charge the capacitor(s) through the resistor and to discharge the capacitor(s) through the diode.

Therefore, in various embodiments, the receiver circuit may monitor the signal received at the output of the optical, inductive or capacitive coupler, and determine a third signal indicative of the first signal and a fourth signal indicative of the second signal.

In various embodiments, a reference signal of the regulation circuit directly corresponds to the fourth signal. For example, this may be useful if the first signal is indicative of the current provided by the electronic converter and if the second signal indicates a maximum current.

In other embodiments, one or more reference signals may be determined as a function of the fourth signal and of a further signal generated on the primary side, e.g. a signal provided by the driver circuit, a sensor and/or a receiver, and/or a signal received through a further terminal of the electronic converter. In this case, the further signal may be e.g. a dimming signal.

FIG. 1 shows a typical lighting system including an electronic converter 10 and at least one lighting module 20. Generally speaking, a lighting module 20 includes one or more light radiation sources including e.g. at least one LED (Light Emitting Diode) or other solid-state lighting means, such as e.g. laser diodes.

Specifically, in the presently considered example, the electronic converter 10 is an AC/DC electronic converter. Therefore, the electronic converter 10 includes two input terminals 102a and 102b for the connection to the mains, and two output terminals 104a and 104b for the connection to the lighting module(s) 20. Typically, line 102a is connected to phase L and terminal 102b is connected to neutral N.

Generally speaking, the electronic converter 10 may be either a voltage generator or a current generator. Similarly, the lighting module 20 may be configured to be supplied with a regulated voltage or current.

Therefore, the electronic converter 10 receives at input, via terminals 102a and 102b, an alternated voltage $V_{in}$, such as 110 or 230 VAC, and supplies at output, via positive terminal 104a and negative terminal 104b, a regulated voltage $V_{out}$, such as e.g. 12 or 24 VDC, or a regulated current $i_{out}$.

Figure 2:
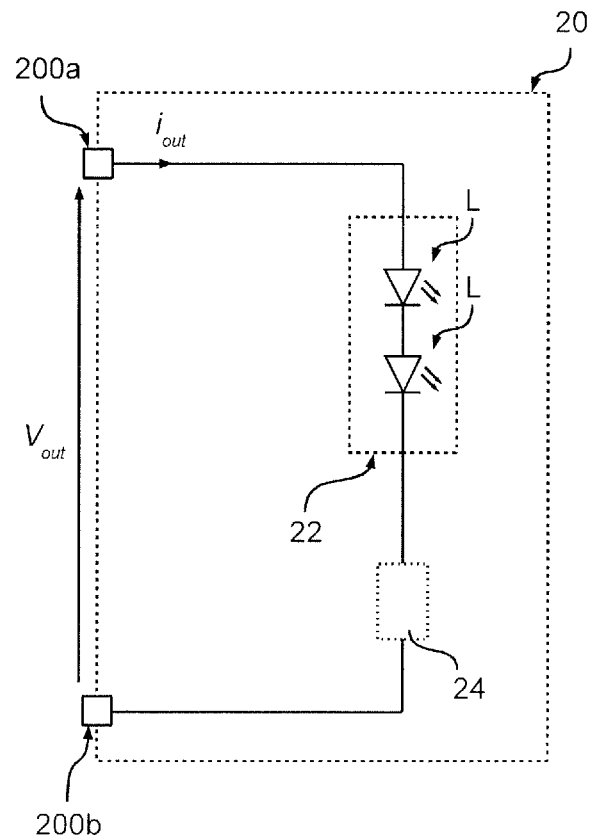
FIG. 2 shows an example of a lighting module 20.

For example, FIG. 2 shows an example of a lighting module 20. Specifically, the lighting module 20 includes a positive input terminal 200a and a negative input terminal 200b, for the connection to the terminals 104a and 104b of electronic converter 10. For example, the lighting module 20 may be connected, either directly or through a cable, to the electronic converter 10. Therefore, the terminal 200a is connected to the positive terminal 104a, and the terminal 200b is connected to the negative terminal 104b, and thus the lighting module receives the regulated voltage $V_{out}$ or the regulated current $i_{out}$.

In the presently considered example, the lighting module 20 is a LED module including one or more LEDs (or laser diodes) L connected between the terminals 200a and 200b. For example, module 20 may include a LED chain or string 22, wherein a plurality of LEDs L (or similarly laser diodes) are connected in series.

If the lighting module 20 is supplied with a regulated voltage, the lighting module 20 typically includes a current regulator 24, connected in series with the LED string 22. In the simplest of cases, the current regulator 24 may be a resistor or a linear current regulator. The current regulator 24 may also be implemented with current mirrors or with a switched mode current source, typically including an inductor and an electronic switch.

Generally speaking, also a plurality of lighting modules 20 may be connected to the electronic converter 10. For example, if a regulated voltage $V_{out}$ is used, the lighting modules 20 may be connected in parallel to the terminals 104a and 104b. On the other hand, if a regulated current $i_{out}$ is used, the lighting modules 20 are typically connected in series between the terminals 104a and 104b.

For safety reasons, the electronic converter 10 is often required to be an insulated converter. Therefore, in this case, the electronic converter 10 includes at least one transformer T including a primary winding T1 and a secondary winding T2.

Figure 3:
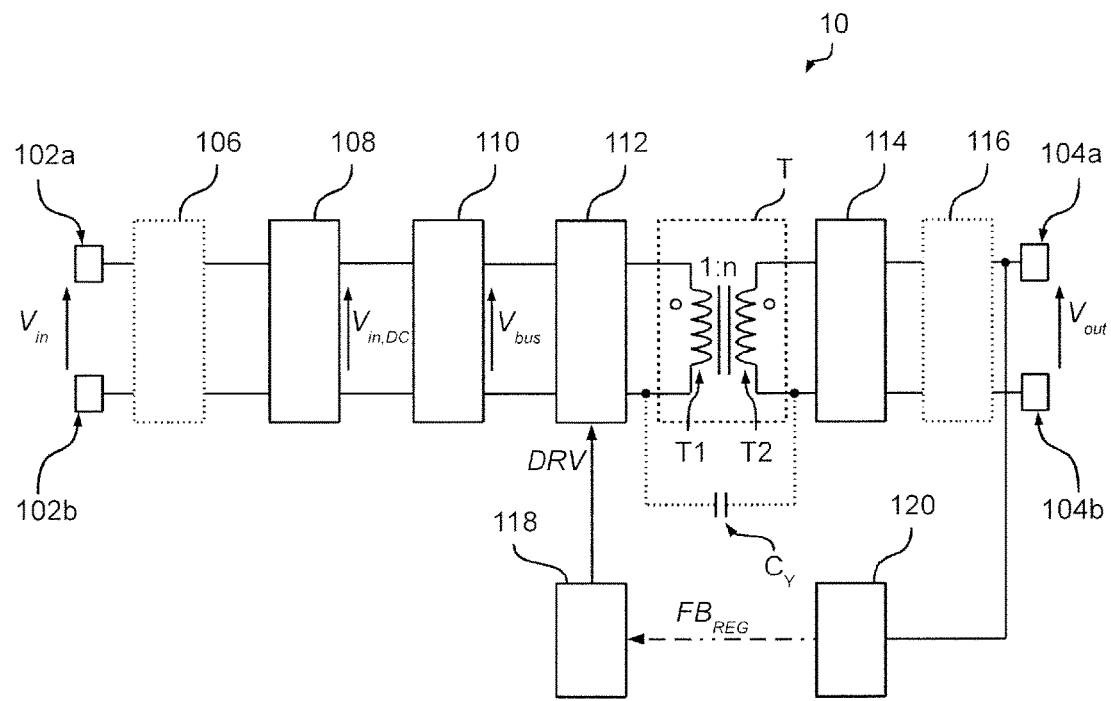
FIG. 3 shows the operating arrangement of an insulated electronic converter.

For example, FIG. 3 shows the operating arrangement of an insulated electronic converter 10.

In this case converter 10 includes, between the input terminals 102a and 102b and the primary winding T1 of transformer T, a rectification circuit 108 and a switching stage 112.

Specifically, the input of the rectification circuit 108, such as e.g. a diode bridge, is connected (e.g. directly) to the terminals 102a and 102b. Therefore, the rectification circuit 108 receives at input the input voltage $V_{in}$ and provides at output a DC voltage $V_{in,DC}$. Generally speaking, between the input terminals 102a and 102b and the rectification circuit 108 there may also be provided a filter circuit 106, configured to filter the noise produced by the electronic converter 10.

The switching stage 112 includes one or more electronic switches, adapted to selectively connect the terminals of primary winding T1 of transformer T to voltage $V_{in,DC}$ provided by the rectification circuit 108. Generally speaking, between the rectification circuit 108 and the switching stage 112 there may be provided a filter circuit 110, such as e.g. a capacitor connected in parallel with the output terminals of the rectification circuit 108. Therefore, in this case, the filter circuit 108 receives (e.g. directly) the voltage $V_{in,DC}$ and provides at output a filtered voltage, typically called bus voltage, $V_{bus}$. In this case, therefore, the switching stage 112 receives at input the voltage $V_{bus}$.

The alternated voltage on the secondary side of transformer T is then converted by means of a rectification circuit 114, typically including one or more diodes (such as e.g. a diode bridge), into a DC voltage. Therefore, the input of the rectification circuit 114 is connected (e.g. directly) to the terminals of the secondary winding T2 of transformer T, and provides at output a DC voltage/current, which in the simplest of cases corresponds to the output voltage/current $V_{out}/i_{out}$. Preferably, there is provided a filter circuit 116 connected between the output of the rectification circuit 114 and the output of converter 10, i.e. the terminals 104a and 104b. Therefore, the filter circuit is configured to stabilize the voltage provided by the rectification circuit 114. For example, possible rectification circuits 114 (with the optional additional use of a transformer with an intermediate connection) and filter circuits 116 are described in document PCT/IB2016/055923, the content whereof is incorporated in the present specification for reference.

In a switching converter, transformer T therefore receives, on the primary side, an alternated voltage which has a switching frequency determined by means of the switching stage 112. Typically, the switching frequency is between 1 kHz and 200 kHz, preferably between 20 kHz and 200 kHz.

Therefore, the electronic converter 10 also includes a control circuit 118, configured to generate one or more driver signals DRV for driving the switching stage 112, so that the output voltage $V_{out}$ or the output current $i_{out}$ may be regulated to a desired value. Generally speaking, the control circuit 118 may be any analog and/or digital circuit, such as e.g. a microprocessor programmed via software code.

To this end, a feedback circuit 120 is typically used which provides a feedback signal $FB_{REG}$ determined as a function of the output voltage $V_{out}$ (for a voltage generator) or of the output current $i_{out}$ (for a current generator).

The light emitted by the light sources of the lighting module 20 is often required to be adjustable, i.e. dimmable.

If the electronic converter 10 supplies a regulated current $i_{out}$, the control circuit 118 may use a pulse width modulation, in order to directly vary the amplitude of said regulated current $i_{out}$ as a function of a dimming control signal.

In addition or as an alternative, the control circuit 118 may enable or disable the output of the electronic converter 10 as a function of the dimming control signal. In this solution, the converter 10 therefore performs the dimming operation, and regulates the average current flowing through the lighting module 20 by switching the output of converter 10, and therefore lighting module 20, on or off. For example, the on/off switching is often driven by means of a Pulse Width Modulation (PWM), wherein the control circuit 118 varies the duty cycle as a function of the dimming control signal. Typically, the PWM frequency is in the range between 100 Hz and 2 kHz.

Figure 4:
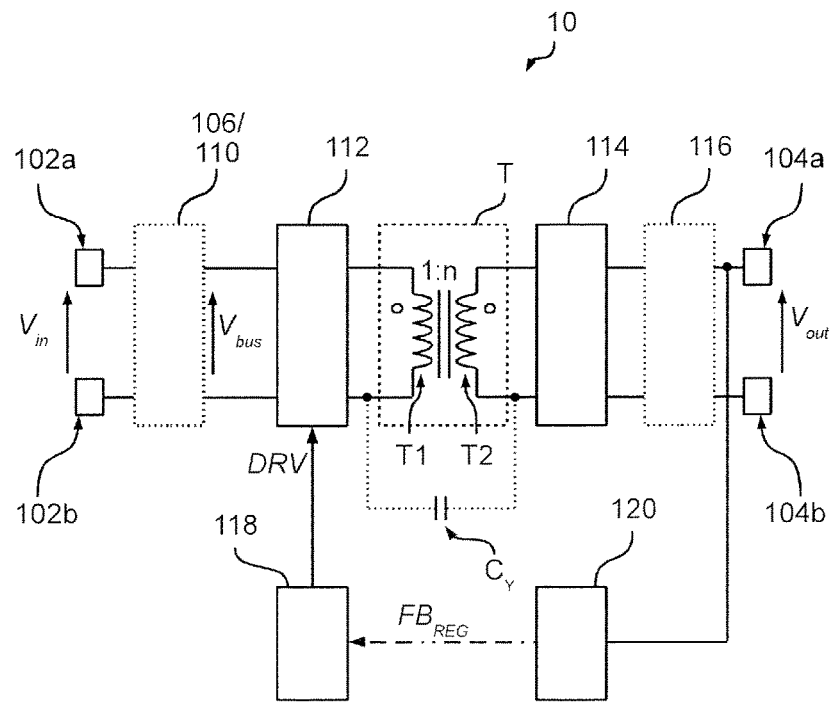
FIG. 4 shows a lighting module wherein the electronic converter is a DC/DC converter.

As shown in FIG. 4, generally speaking, the electronic converter 10 may also be a DC/DC converter. In this case, the input terminals 102a and 102b are connected to a DC voltage generator, such as e.g. a battery, or the input voltage $V_{in}$ is a DC voltage. In this instance, the presence of a rectification circuit 108 is not mandatory, and the optional filter circuits 106 and 110 may be combined into one filter circuit. For the rest, the architecture corresponds to what shown in FIG. 3.

Therefore, as stated in the foregoing, due to the presence of a transformer T, a feedback circuit 120 is required which is adapted to transmit a regulation/feedback signal $FB_{REG}$ through the insulation barrier created by transformer T.

Figure 5:
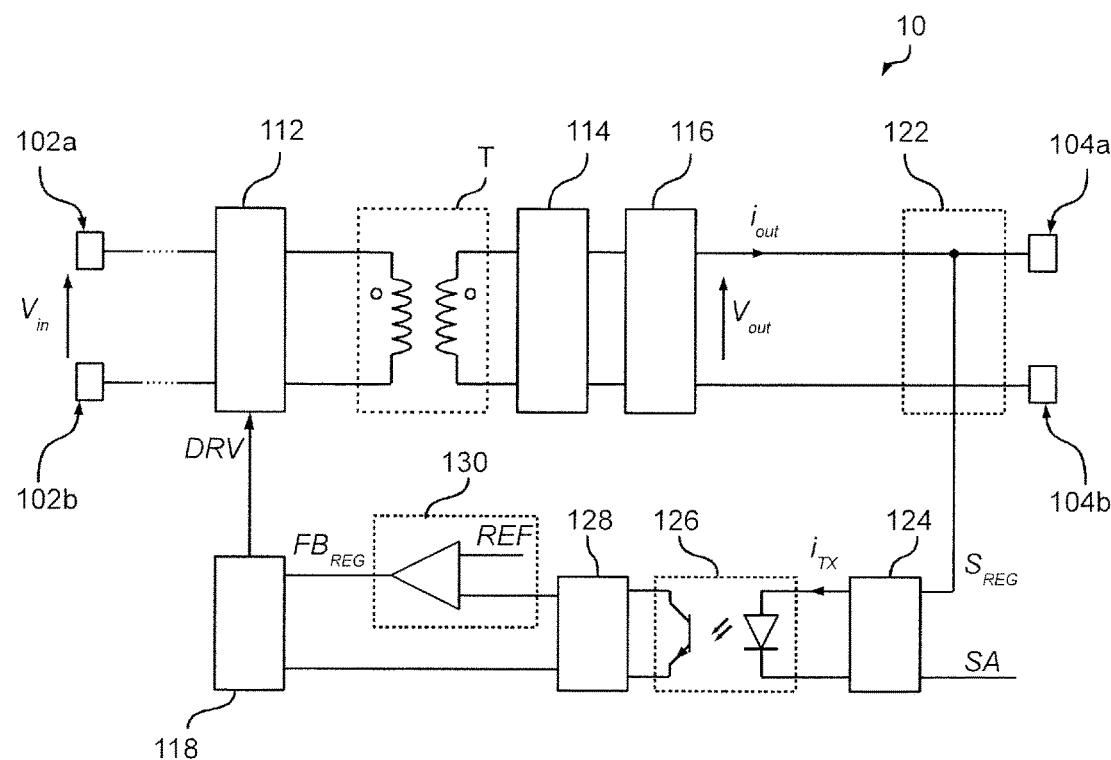
FIG. 5 shows an embodiment of a feedback circuit.

In this respect, FIG. 5 shows a possible solution for said feedback circuit 120.

In the presently considered example, the feedback circuit 120 includes:
  a measurement circuit 122, configured to generate a measurement signal $S_{REG}$ indicative of the output voltage $V_{out}$ or of the output current $i_{out}$;
  an optocoupler/optoisolator 126, including e.g. a LED and a phototransistor;
  a transmission circuit 124, configured to drive the optocoupler 126 as a function of the signal $S_{REG}$; and
  a receiver circuit 128, configured to monitor the output of optocoupler 126 in order to detect signal $S_{REG}$.

For example, in FIG. 5, the driver circuit 124 receives the signal $S_{REG}$ and generates a corresponding current $i_{TX}$ for driving the optocoupler 126. On the other hand, the receiver circuit 128 monitors the voltage at the output of optocoupler 126, which is indicative of the current $i_{FB}$. Generally speaking, the optocoupler 126 may also be replaced with other optical, capacitive or inductive transceiver means.

Typically, the feedback circuit also includes a regulation unit 130, configured to generate the regulation signal $FB_{REG}$ as a function of the signal $S_{REG}$. The regulation unit 130 is often an error amplifier 130, typically in the form of a PI (Proportional-Integral) regulator or a PID (Proportional-Integral-Derivative) regulator, which compares the transmitted value with a reference signal REF. Alternatively, the regulation unit 130 may be a comparator, typically a comparator with hysteresis, configured for generating the regulation signal $FB_{REG}$ by comparing the signal $S_{REG}$ with a plurality of reference signals REF, typically a lower threshold and an upper threshold.

Generally speaking, the regulation unit 130 may also be integrated into the control circuit 118, e.g. in the form of a dedicated software module and/or hardware module of a microcontroller.

Moreover, the regulation unit 130 may be located on the secondary side of the electronic converter, and the transmission circuit 124 may transmit the regulation signal $FB_{REG}$. Typically, the regulation unit 130 is on the side where the reference signal(s) REF are generated. For example, the regulation unit 130 is typically on the primary side if the reference signal(s) REF are provided by the control circuit 118.

In many applications, one or more further signals SA are required to be transmitted from the secondary side to the primary side of transformer T, e.g. if a feedback of the output voltage $V_{out}$ and of the output current $i_{out}$ is required.

Generally speaking, the additional signals SA to be transmitted may be analog signals (i.e. signals having continuous values) or digital signals (i.e. signals having discrete values, typically in the form of a bit sequence).

The simplest of solutions involves employing a plurality of substantially independent transmission circuits 124. To this end, for each signal SA there are provided a respective optocoupler 126 and a respective receiver circuit 128.

As shown in FIG. 5, other solutions are known wherein a single optocoupler 126 and a single transmission circuit 124 are used in order to transmit one or more additional signals SA. To this end, the transmission circuit 124 varies the driver signal ($i_{TX}$ in the presently considered example) as a function of the measurement signal $S_{REG}$ and of the added signal(s) SA.

For example, in certain solutions, all signals ($S_{REG}$ and SA) are digitalized by means of an analog/digital (A/D) conversion, and the transmission circuit 124 transmits data packages which include the digitalized signals. Said solution, however, has a drawback in that the A/D conversion and the digital transmission introduce a delay which is often too high to enable a regulation within a switching electronic converter, i.e. the change frequency of signal $S_{REG}$ is higher than the transmission frequency of the data packages. For this reason, said solution is not normally used for the feedback of signal $S_{REG}$, which is determined as a function of the output voltage $V_{out}$ (for voltage generators) or of the output current $i_{out}$ (for current generators).

Moreover, solutions are known which may be employed for transmitting, together with the signal $S_{REG}$ of the electronic converter, one or more bit sequences which identify one or more additional signals SA.

In the following FIGS. 6 and 21, the parts, the elements or the components which have already been described with reference to FIGS. 1 to 5 are denoted with the same references which have previously been used in said Figures; the description of said previously described elements will not be repeated in the following, in order not to overburden the present detailed description.

As previously mentioned, the present specification provides solutions for transmitting one or more signals in addition to a main feedback signal from the secondary side to the primary side, in an electronic converter as previously described with reference to FIGS. 1 to 5. Therefore, the description thereof will not be repeated in the following.

Figure 6:
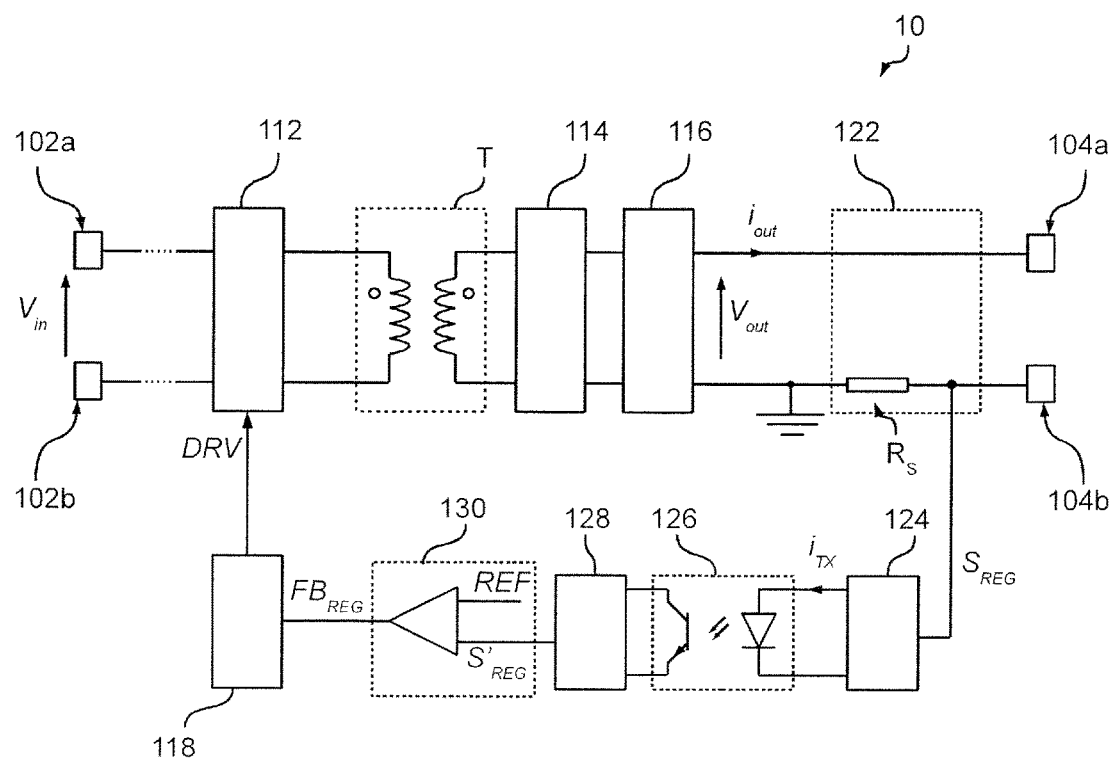
FIG. 6 shows an embodiment of an electronic converter with a feedback circuit.

For example, similarly to what has been described with reference to FIG. 5, FIG. 6 shows an electronic converter 10 with current control, i.e. the electronic converter 10 is a current generator which supplies a regulated current $i_{out}$.

Therefore, as previously described with reference to FIGS. 1 to 4, the electronic converter 10 includes, on the primary side, at least one switching stage 112 and optionally a filter circuit 110. If the input voltage $V_{in}$ is an alternated voltage, the electronic converter 10 may also include a rectification circuit 108 and optionally an input filter 106. On the other hand, on the secondary side, the electronic converter 10 includes a rectification circuit 114 and optionally a filter circuit 116.

In order to perform the regulation, i.e. in order to regulate the output current $i_{out}$ to a desired value, the electronic converter 10 includes a feedback circuit, adapted to generate a regulation signal $FB_{REG}$ as a function of the output current $i_{out}$, and a control unit 118 adapted to generate one or more driver signals DRV for the switching stage 112 as a function of the feedback signal $FB_{REG}$.

For example, in the presently considered embodiment, the feedback circuit includes a measurement circuit 122 configured for generating a signal $S_{REG}$ indicative of the output current $i_{out}$. For example, in the presently considered embodiment, the negative terminal of the filter circuit 116 (which is typically connected directly to the negative output terminal of the rectification circuit 114) corresponds to the ground GND on the secondary side. In the presently considered embodiment, a so-called shunt resistance $R_S$ is connected (e.g. directly) between ground GND and the negative output terminal 104b, while the positive output terminal 104a is connected (e.g. directly) to the positive output terminal of the filter circuit 116. Therefore, the voltage at shunt resistor $R_S$ may be used as a signal $S_{REG}$, because said voltage is indicative of the output current $i_{out}$. However, other current sensors may be employed.

The feedback circuit moreover includes:
- an optocoupler/optoisolator 126, including e.g. a LED and a phototransistor, or other optical, capacitive or inductive transmitting and receiving means;
- a transmission circuit 124, configured to drive the optocoupler 126 as a function of signal $S_{REG}$; and
- a receiver circuit 128, configured for monitoring the output of optocoupler 126 in order to detect a signal $S'_{REG}$ indicative of the signal $S_{REG}$.

Figure 7:
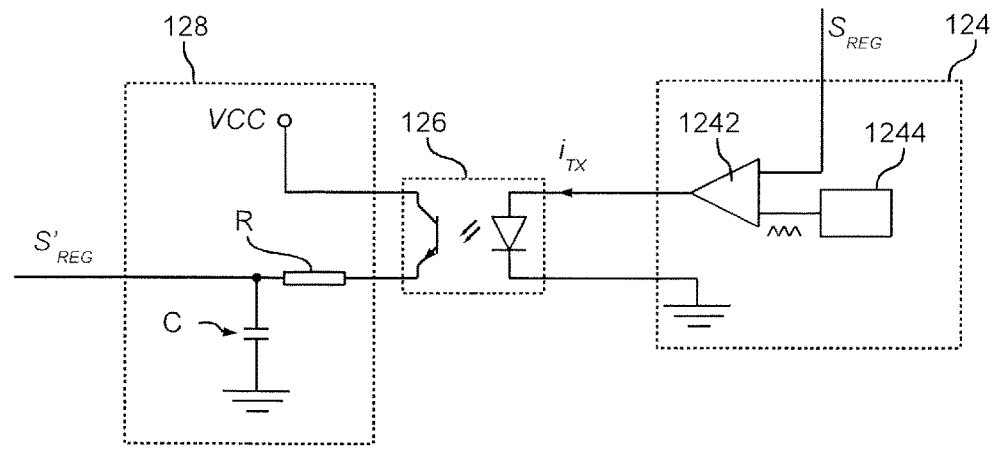
FIG. 7 shows an embodiment of a feedback circuit for the electronic converter of FIG. 6.

For example, FIG. 7 shows a possible embodiment of the transmission circuit 124 and of the receiver circuit 128.

As stated in the foregoing, the transmission circuit 124 is configured to generate a driver signal $i_{TX}$, such as e.g. a driving current, for the optocoupler 126, i.e. the optical, capacitive or inductive transmitting and receiving means. In various embodiments, said driver signal $i_{TX}$ is a pulse width modulated signal, wherein the transmission circuit 124 varies the duty cycle of said signal as a function of the signal $S_{REG}$.

For example, in FIG. 7, the transmission circuit 124 to this end includes an oscillator circuit 1244 and a comparator 1242. Specifically, the oscillator circuit 124 is configured for generating a triangular signal (wherein the rising period preferably corresponds to the falling period) or a sawtooth signal (i.e. the falling period is substantially zero) with a given oscillation frequency, which is chosen e.g. between 10 and 500 kHz, e.g. 30 kHz. The comparator 1242 receives both signal $S_{REG}$ (typically at the positive terminal) and the signal generated by the oscillator circuit 1244 (typically at the negative terminal), and provides at output the driver signal $i_{TX}$. Therefore, the period during which the signal at the output of comparator 1242 is high depends on the amplitude of the signal $S_{REG}$, while the frequency of the signal corresponds to the frequency of the signal generated by the oscillator circuit 1244.

Therefore, the optocoupler 126 transmits a PWM signal, wherein the duty cycle depends on the amplitude of signal $S_{REG}$.

The receiver circuit 128 is therefore configured to determine a signal $S'_{REG}$ indicative of the duty cycle of the transmitted signal.

For example, if the optocoupler includes an npn phototransistor, the drain of such transistor may be connected to a reference voltage, e.g. the VDC voltage used by low-voltage circuits, such as e.g. a voltage of 3, 3.3 or 5.0 VDC. Therefore, the emitter of such a transistor supplies a signal indicative of the transmitted optical signal.

In the presently considered embodiment, said signal is supplied to a low-pass or band-pass filter circuit, which therefore determines a signal indicative of the average transmitted value, which in turn depends on the duty cycle of the transmitted signal. For example, in the simplest of cases the filter circuit is an RC filter, including e.g. a resistor R and a capacitor C connected between the emitter of the phototransistor and ground GND. However, it is also possible to use active filters.

Therefore, the signal at the output of the filter circuit, e.g. the voltage at capacitor C, may be used as signal $S'_{REG}$. In the presently considered embodiment, the signal $S'_{REG}$ provided by the receiving circuit is therefore indicative of (and typically proportional to) the output current $i_{out}$.

As shown in FIG. 6, said signal $S'_{REG}$ may therefore be used in order to control the operation of the switching stage 112.

For example, in various embodiments, the signal $S'_{REG}$ is supplied to a regulation circuit 130, which is configured for generating a regulation signal $FB_{REG}$ as a function of signal $S'_{REG}$ and one or more reference signals REF. For example, in various embodiments, the regulation circuit 130 is a PI or a PID regulator, or a comparator with hysteresis.

Therefore, in the presently considered embodiment, the control unit 118 may be a traditional dedicated integrated circuit (e.g. a PWM controller), configured to drive the switching stage 112 as a function of the regulation signal $FB_{REG}$.

Figure 8:
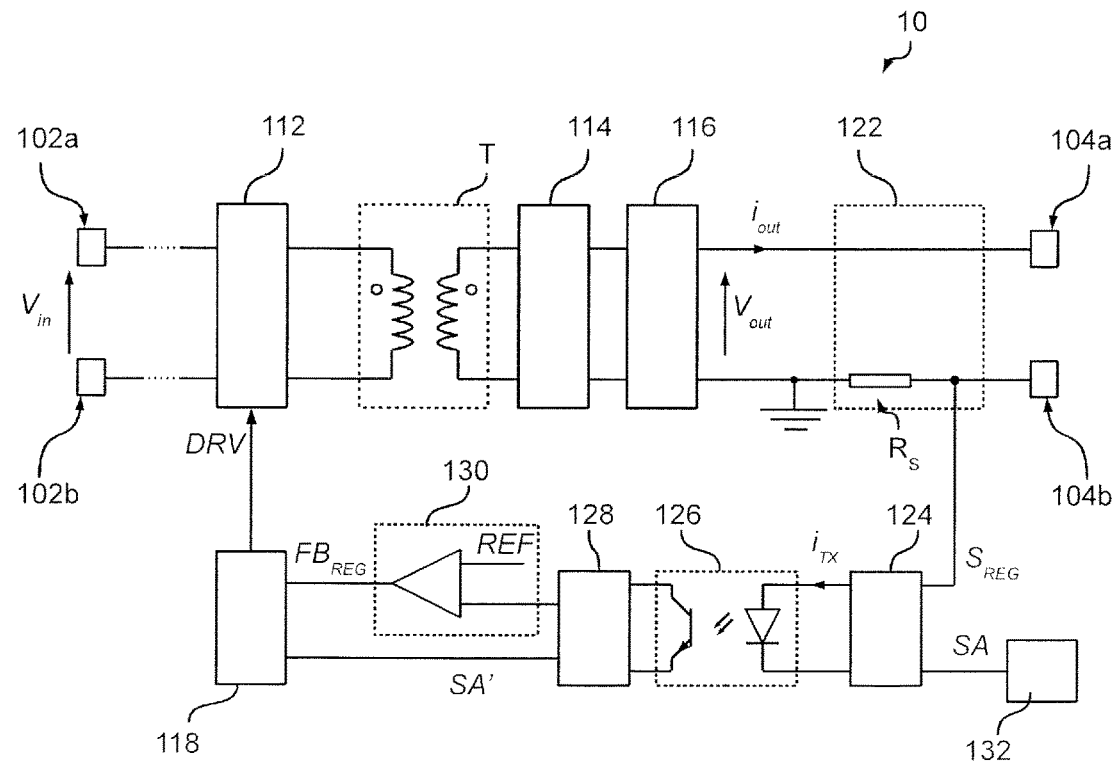
FIG. 8 shows a first embodiment of an electronic converter with a feedback circuit according to the present specification.

FIG. 8 shows an embodiment wherein the circuit in FIG. 6 has been modified in order to enable the transmission of an additional analog signal SA provided by a circuit 132.

For example, said additional analog signal SA may be provided by a circuit 132, adapted to detect the output voltage $V_{out}$, such as e.g. a voltage divider. However, other circuits 132 may be used which provide an additional signal, such as e.g.:
- a sensor configured to detect the type and/or the operating status of the lighting module 20; and/or
- a light sensor configured to detect the ambient light, or the brightness and/or the colour of the light emitted by the lighting module 20; and/or
- a temperature sensor, configured to detect the temperature of the electronic converter 10 and/or of the lighting module 20;
- a sensor of other environmental data, such as e.g. the ambient temperature.

In various embodiments, the transmission circuit 124 is configured to transmit said additional analog signal SA (together with signal $S_{REG}$) by varying the frequency of the PWM signal as a function of the signal SA.

In the presently considered embodiment, the receiver circuit 128 is therefore configured for generating (in addition to signal $S'_{REG}$) a signal SA' indicative of the frequency of the PWM signal transmitted via the optocoupler 126.

For example, the control circuit 118 may employ said signal in order to control the operation of the switching stage, e.g. in order to switch the converter off if a malfunction is detected.

Figure 9:
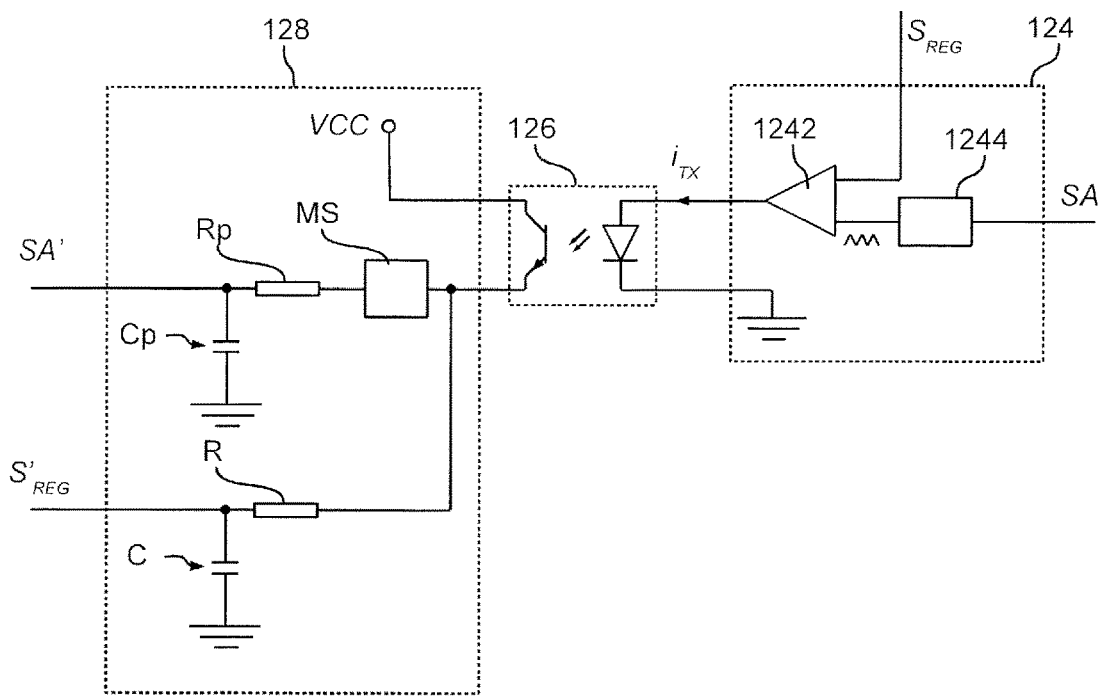
FIG. 9 shows an embodiment of a feedback circuit for the electronic converter of FIG. 8.
Figure 10:
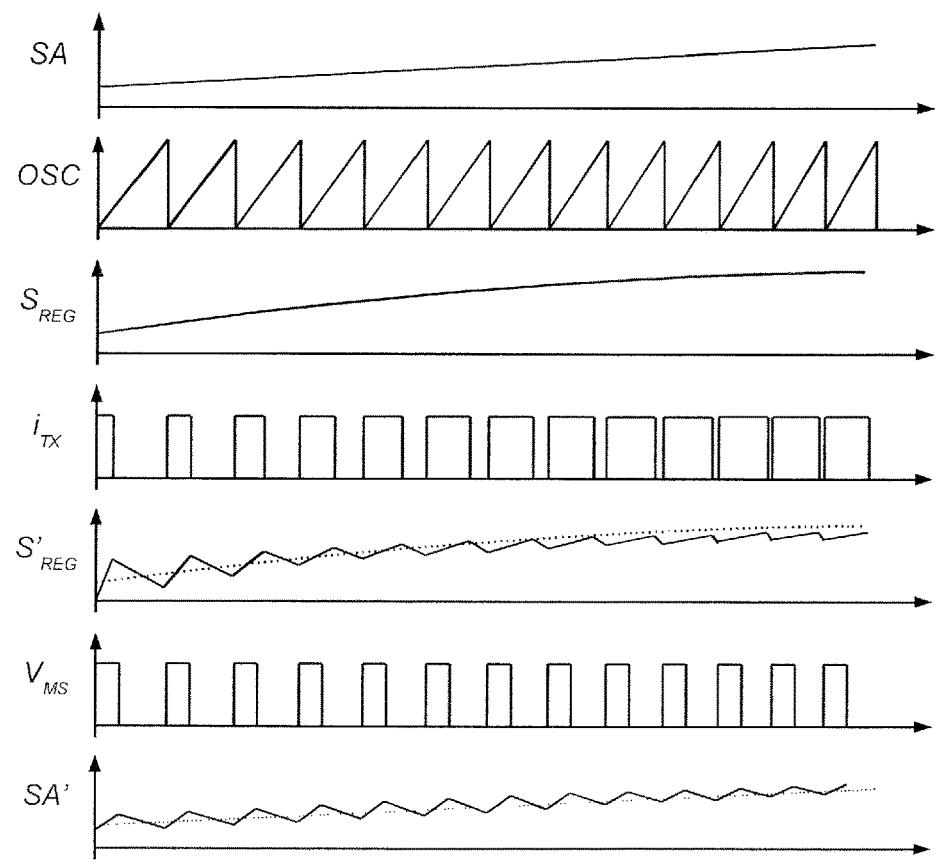
FIG. 10 shows possible waveforms of the feedback circuit of FIG. 9.

For example, FIG. 9 shows an embodiment wherein the oscillator circuit 1244 includes an oscillator with controllable frequency, e.g. a voltage-controlled oscillator. Therefore, in the presently considered embodiment, the oscillator circuit 1244 is configured to generate a triangular or sawtooth shaped signal having an oscillation frequency which is determined as a function of the signal SA, e.g. chosen in a range of 10-500 kHz. For example, FIG. 10 shows a possible shape of signal SA and of a relative signal OSC at the output of oscillator 1244.

Therefore, comparator 1242 generates the driver signal for the optocoupler 126 by comparing the signal $S_{REG}$ (having variable amplitude) with the signal OSC (having variable frequency). For example, FIG. 10 also shows possible waveforms for the signals $S_{REG}$ and $i_{TX}$.

As stated in the foregoing, a first filter (including e.g. resistor R and capacitor C) enables the retrieval of signal $S'_{REG}$. FIG. 10 shows an example of the reconstructed signal $S'_{REG}$.

Moreover, the receiver circuit 128 includes means for generating a signal SA' indicative of the frequency of the transmitted PWM signal.

For example, in the presently considered embodiment, the signal at the output of optocoupler 126 is also supplied to a circuit MS, configured to generate a pulse of fixed duration every time that the signal at the output of the receiver circuit 126 exhibits a rising edge (and/or a falling edge). For example, the circuit MS may be implemented via a monostable circuit. FIG. 10 also shows an example of the voltage $V_{MS}$ at the output of circuit MS.

In the presently considered embodiment, the signal at the output of circuit MS is then filtered by means of a low-pass or band-pass filter. For example, in the presently considered embodiment an RC filter is used which includes a resistor Rp and a capacitor Cp connected between the output of circuit MS and ground. Therefore, said circuit generates a signal SA' indicative of the average voltage value at the output of circuit MS, which (the pulse duration being constant) in turn depends on the frequency of the transmitted signal. FIG. 10 also shows an example of the reconstructed signal SA'.

Therefore, the feedback circuit shown in FIGS. 8 and 9 transmits a PWM signal. Specifically, said signal includes pulses having a given on time $T_{on}$ and off time $T_{off}$, wherein the pulses are repeated periodically with a duration $T=T_{on}+T_{off}$. Specifically, the transmission circuit 124 transmits a PWM signal, wherein the duty cycle $DC=T_{on}/T$ is determined as a function of a first signal (typically signal $S_{REG}$ used for the regulation of the output of the electronic converter) and the frequency $f=1/T$ is determined as a function of a second signal.

Generally speaking, circuits 124 and 128 may be used also if electronic converter 10 is a voltage generator (similar to what has been described with reference to FIG. 5).

Figure 11:
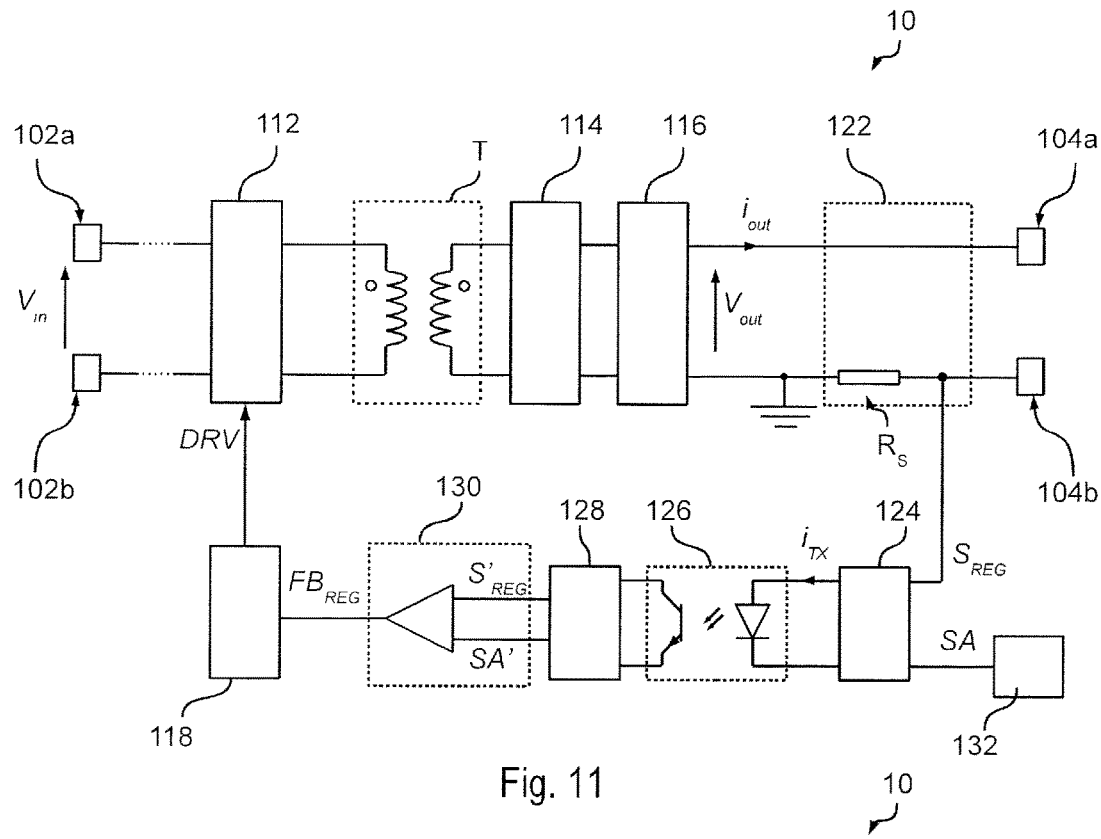
FIG. 11 shows a second embodiment of an electronic converter with a feedback circuit according to the present specification.

FIG. 11 shows a second embodiment of an electronic converter 10, which may be used if circuit 132 provides a signal which directly determines current $i_{out}$ which the converter is supposed to supply.

In this case, the regulation circuit 130 may therefore directly use the signal SA' as a reference signal of the regulation circuit 130. For example, if circuit 130 includes a PI or PID regulator, the regulator varies the signal $FB_{REG}$ until signal $S'_{REG}$ corresponds to signal SA'.

In the presently considered embodiment, the control unit 118 may therefore be a traditional driver circuit, as described with reference to FIG. 5.

For example, this embodiment may be used if circuit 132 includes a temperature sensor, e.g. an NTC, and the output current (or voltage) $i_{out}$ ($V_{out}$) should be reduced if the temperature of the electronic converter 10 and/or of the lighting module exceeds a given threshold.

Similarly, circuit 132 may include means for detecting the type of the lighting module 20 (e.g. by sensing the value of a resistor within lighting module 20) and for generating a signal SA indicative of the current (or voltage) required by the lighting module 20.

Moreover, if the electronic converter is a current generator, circuit 132 may be configured to generate a signal SA indicative of the brightness required. To this end, circuit 132 may include means, such as e.g. a potentiometer, in order to directly vary the signal SA, or a receiver (e.g. a radiofrequency o infrared receiver) in order to receive commands from a remote transmitter, such as e.g. a remote control or a sensor of ambient light.

In the known solutions, regulator 130 was only provided on the secondary side, so that only error signal $FB_{REG}$ had to be transmitted to the primary side, avoiding therefore the transmission of a plurality of signals. However, the inventor has observed that, in many applications, the reference signal(s) REF of the regulation circuit 130 may need to be determined as a function of signals generated both on the primary and on the secondary side.

Figure 12:
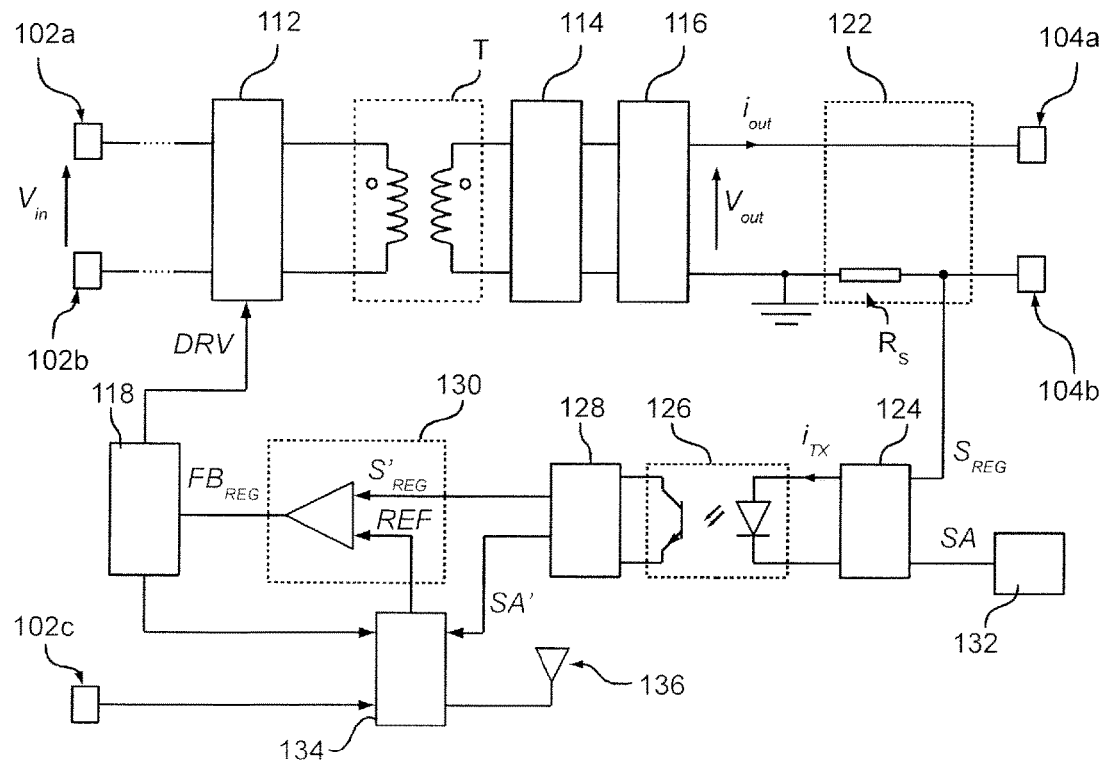
FIG. 12 shows a third embodiment of an electronic converter with a feedback circuit according to the present specification.

For example, as shown in FIG. 12, the electronic converter 10 may include a circuit 134 configured to generate one or more reference signals REF for the regulation circuit 130, as a function of:
- the transmitted SA' signal, and
- a signal generated on the primary side of the electronic converter 10, e.g. provided by the control circuit 118; and/or
- a signal received via a terminal 102c and/or generated by a sensor or receiver 136, such as e.g. a wireless receiver, arranged on the primary side of the electronic converter 10.

Generally speaking, the sensors or receivers 136 may be one or more of the sensors or receivers described with reference to the means 132.

For example, in various embodiments, the circuit 132 provides a signal SA indicative of the maximum output current. For example, as stated in the foregoing, to this end circuit 132 may sense the resistance of a resistor within the lighting module 20. Generally speaking, circuit 132 may obtain said value via any analog or digital communication. On the other hand, the circuit 118, the terminal 102/c and/or the sensor or receiver 136 may provide a dimming signal, e.g. a signal which identifies a percentage of the maximum required brightness. In this case, circuit 134 may therefore combine the signal SA' indicative of the maximum current and the dimming signal, in order to generate a reference signal REF indicative of the currently required current, in order to reach the desired brightness.

Similarly, circuit 118 may provide a signal indicative of the maximum required current, and optionally the terminal 102c and/or the sensor or receiver 136 may provide a signal identifying a percentage of the maximum required brightness. Conversely, circuit 132 may be configured to detect a malfunction of the lighting module 20 (e.g. excessive temperature, short circuit etc.) and generate a signal SA indicative of such malfunction. Therefore, if a malfunction is not detected, the circuit 134 may generate a reference signal REF indicative of the current which is required at the moment as a function of the signal provided by the control circuit 118 (and optionally terminal 102c and/or sensor or receiver 134). Conversely, if a malfunction is detected, circuit 134 may reduce the reference signal REF, so as to reduce the output current (e.g. in case of detection of a temperature increase of the lighting module 20) or may deactivate the electronic converter 10.

Therefore, the embodiment described with reference to FIG. 12 enables the combination of various signals from the secondary as well as from the primary side, in order to generate a single reference signal (or optionally a plurality thereof, for example if a plurality of comparators are used) for regulation.

Thus, the previously described embodiments enable transmitting the amplitude of a single additional analog signal SA, by substantially continuously varying the frequency of the transmitted PWM signal. Generally speaking, the transmitted SA signal may be generated also as a function of a plurality of signals. For example, the amplitude of said signal SA may already originate from the combination of a first signal, indicative of the maximum current, and of a second signal indicative of the temperature of the lighting module 20 and/or of a dimming signal.

Generally speaking, the signal SA may also be a digital signal. For example, to this end it is possible to use a digital/analog converter, which again provides an analog signal to oscillator 1244, or the oscillator 1244 may support a plurality of discrete frequencies and a digital control.

Figure 13:
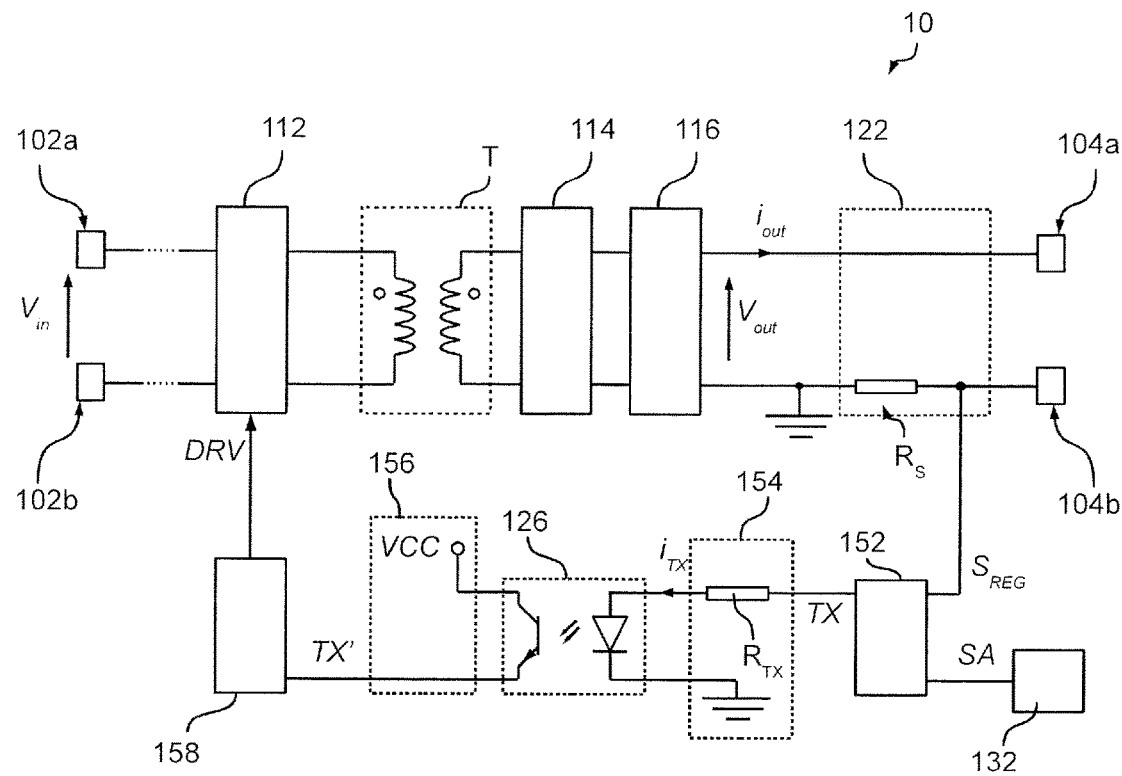
FIG. 13 shows a fourth embodiment of an electronic converter with a feedback circuit according to the present specification.

On the other hand, FIG. 13 shows an embodiment wherein two digital circuits are used for transmitting signal $S_{REG}$ and signal SA.

Specifically, on the secondary side there is provided a first digital circuit 152, configured to directly generate a transmission circuit TX (similar to what has been previously described with reference to driver signal $i_{TX}$), or a PWM signal, wherein the duty cycle is determined as a function of a first signal (e.g. $S_{REG}$) and the frequency is determined as a function of a second signal (e.g. SA).

In various embodiments, the digital circuit 152 may have an analog/digital circuit associated thereto (not shown in FIG. 13) for converting signal $S_{REG}$ and optionally signal SA (if said signal is analog) into respective digital signals.

However, in this case, the digital circuit 152, such as e.g. a microcontroller programmed via software code (which may also include the A/D converter) directly generates the PWM signal TX by varying the duty cycle and the frequency of said signal. For example, said PWM signal generator within circuit 152 may be implemented as a digital (hardware or software) counter, or as a hardware PWM signal generator. Therefore, in the presently considered embodiment:
- the duty cycle of signal TX may have a number of discrete values which substantially corresponds to the resolution of the analog/digital converter used for the conversion of the second signal (or to the resolution actually used for the conversion); and
- the frequency of signal TX may have a number of discrete values which substantially corresponds to the resolution of the analog/digital converter used for the conversion of the second signal (or to the resolution actually used for the conversion).

The digital circuit 152 may have a driver circuit 154 associated thereto, which may be configured to transmit the signal TX by means of optocoupler 126. For example, typically a digital circuit provides an output voltage. Therefore, the driver circuit 154 may include a resistor RTX which is serially connected with the diode of an optocoupler 126, between the output TX of the digital circuit 152 and ground GND, thereby setting the maximum current if the logical level of the signal TX is high.

Similarly, the electronic converter 10 includes, on the primary side, a second digital circuit 158. Generally speaking, said circuit 158 may be added to the control unit 118 and/or the regulation circuit 130 or may perform, at least partially, the functions of the control unit 118 and/or of the regulation circuit 130.

In the presently considered embodiment, the digital circuit 158 has a receiver circuit 156 associated thereto, which is configured to generate a signal TX' indicative of the signal TX transmitted via the coupler 126, which may be optical, capacitive or inductive. For example, in the simplest of cases, the drain of a phototransistor may be connected to a reference (e.g. VDC) voltage, and the emitter of the phototransistor may supply the signal TX'.

Therefore, in the presently considered embodiment, the digital circuit 158 may analyse signal TX' in order to determine the duty cycle and the frequency of signal TX'. Also to this end it is possible to use at least one counter (software or hardware).

Generally speaking, the embodiments described in the foregoing may also be combined. Actually, as the signals transmitted via the optical/capacitive/inductive coupler 126 are substantially identical, on the primary side it is possible to use circuit 128 or alternatively circuits 156 and 158. Similarly, on the secondary side it is possible to use circuit 124 or alternatively circuits 152 and 154. Generally speaking, it is also possible to use both circuits on the primary side, e.g. the circuit 124 for the analysis of the duty cycle (or of the frequency) and the circuit 158/158 for the analysis of the frequency (or of the duty cycle).

The previously described solutions have the advantage that a traditional electronic converter 10 supporting the feedback of a single analog regulation signal $S_{REG}$ may be modified in such a way as to support various functions. Actually, as described with reference to FIG. 12, it is sufficient to add the transmission and receiver circuits 124/152 and 128/158 and a circuit 134 configured to generate one or more reference signals REF, used by a traditional regulation circuit 130 as a function of the additional transmitted signal SA, and/or of signals received or generated on the primary side of converter 10. Therefore, especially with an analog solution (see e.g. FIG. 9), only few low-cost components must be added to implement said new functions.

The inventor has observed that, if signal SA is a digital signal which varies slowly (compared to the transmission frequency, i.e. the frequency of the PWM signal transmitted through the optocoupler 126), circuits 124 and 152 may be configured to transmit the bits of said signal SA in sequence. Actually, the solution previously described with reference to FIG. 13 requires a digital circuit 152 having a high clock frequency, in order to vary, in a substantially continuous fashion, the frequency and at the same time the duty cycle of the PWM signal. On the contrary, a bit may only have two levels. Therefore, even with a low-frequency microprocessor, signal $S_{REG}$ may be transmitted rapidly, while the additional signal SA is transmitted slowly, by transmitting only one bit of the additional signal SA at every cycle.

Generally speaking, the transmitted bit sequence may also include other data. For example, circuits 124 and 152 may be configured to transmit a data package including a bit sequence identifying a plurality of added signals (e.g. the output voltage $V_{out}$ and the current required by the lighting module).

Figure 14:
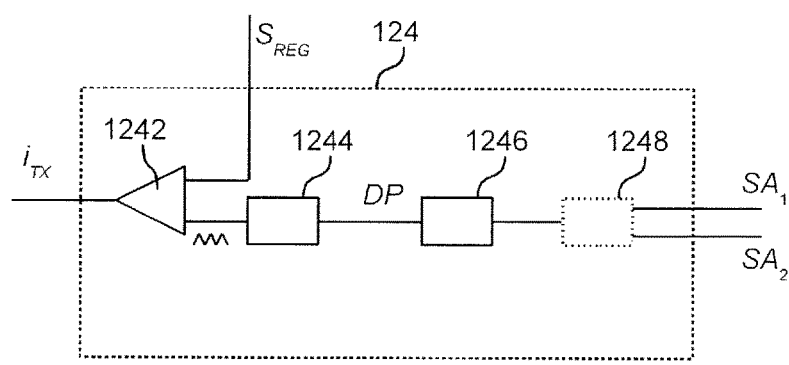
FIG. 14 shows an embodiment of a transmission circuit for a feedback circuit.

For example, as shown in FIG. 14, the circuit 124 may include an analog-digital converter 1248, configured for converting one or more added signals SA, e.g. two signals $SA_1$ and $SA_1$, into corresponding digital signals. Said converter 1248 is merely optional, because the signals SA may already be digital.

Said digital signals are supplied to a PISO (Parallel-In Serial-Out) register 1246, which provides a signal DP corresponding to a bit sequence of a data package including the digital signals SA.

Therefore, in this case, the PWM signal transmitted through the optical/capacitive/inductive coupler 126 has only two possible frequencies. Preferably, the higher frequency fa (e.g. for a "1" bit) corresponds to a multiple of the lower frequency fb (e.g. for a "0" bit).

Figure 15:
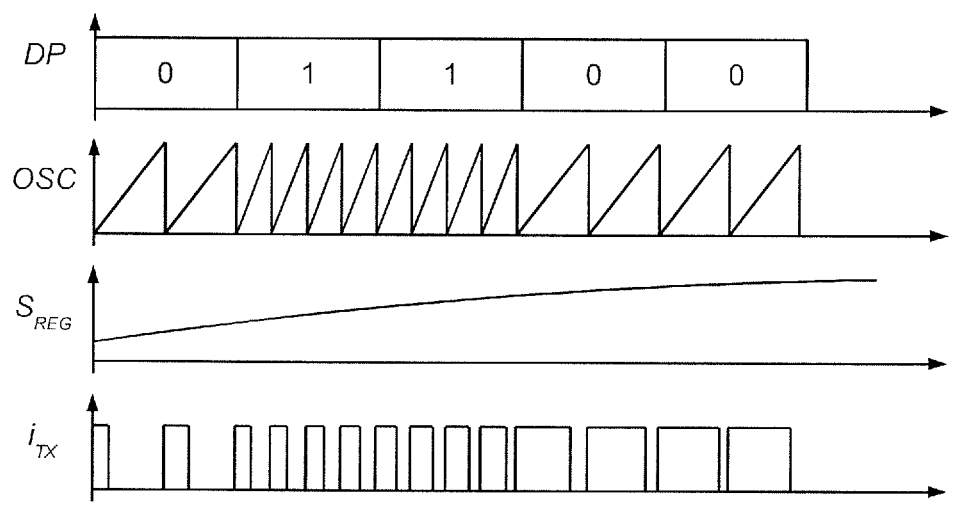
FIGS. 15, 16 and 17 show possible waveforms of the feedback circuit of FIG. 14.

For example, FIG. 15 shows an example for signal DP and a corresponding signal OSC generated by oscillator circuit 1244.

Figure 16:
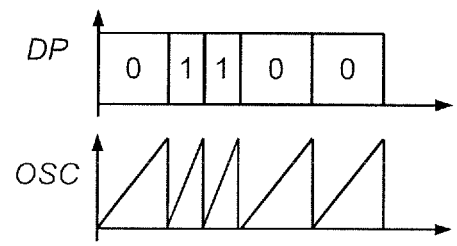

Generally speaking, the reading of bits from register 1246 is synchronized with the operation of the oscillator circuit 1244. For example, in FIG. 15, the reading of bits takes place at a fixed frequency, wherein said frequency corresponds to a fraction of the lower frequency fb generated by the oscillator circuit 1244. However, as shown in FIG. 16, the reading of bits may also take place at the end of the transmission of the preceding bit, e.g. at the end of each triangle or ramp (or after a given number of triangles or ramps) in the signal OSC generated by the oscillator circuit 1244.

The inventor has observed that, in some instances, the transmission of the PWM signals described in the foregoing may create electromagnetic interferences and/or may cause flickering in the emitted light.

For example, in static conditions, the transmitted signal ($i_{TX}$, TX) may correspond to a PWM signal, wherein the frequency and the duty cycle are fixed. Therefore, it is possible to create harmonics originating from this square-wave pulses having fixed duration.

Figure 17:
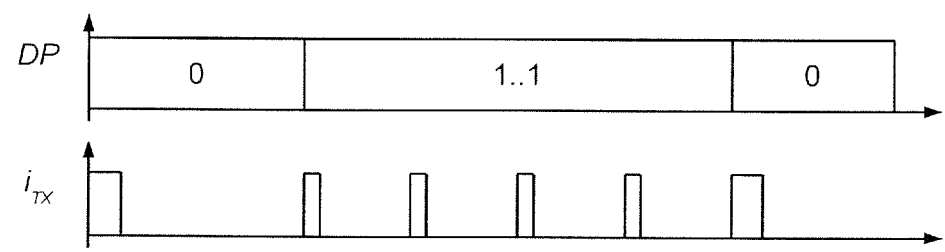

Moreover, as shown in FIG. 17, by transmitting constant bit sequences, specifically sequences which include all the bits set to a first value with the exception of a single bit, e.g. sequences such as "1 . . . 10" or "0 . . . 01", the periodical transmission of such sequences may create additional low-frequency harmonics which, if not properly filtered, may even cause a low-frequency variation of the regulation signal $FB_{REG}$, and consequently of the light emitted by the lighting module 20. The same problem may arise (typically in a less evident fashion) with an analog transmission, e.g. if the additional signal SA varies periodically.

Finally, the means 126 (irrespective of their optical, capacitive or inductive nature) are not ideal. As a consequence, the signal switching times from high to low and vice versa are not zero. Such switching times not only impair the maximum implementable duty cycle, but in addition they can result in a duty cycle of the transmitted signal which also varies as a function of the transmission frequency of the PWM signal. Therefore, the signal $S'_{REG}$ (or equally TX', digitally filtered within circuit 158) will exhibit a ripple. Similarly to what has been stated in the foregoing, also such ripple may create a variation of the low-frequency signal $S'_{REG}$, which creates a visible variation of the light emitted by the lighting module 20.

In various embodiments, in order to reduce such effects, the bits of signal DP are transmitted by using a Manchester encoding.

Figure 18:
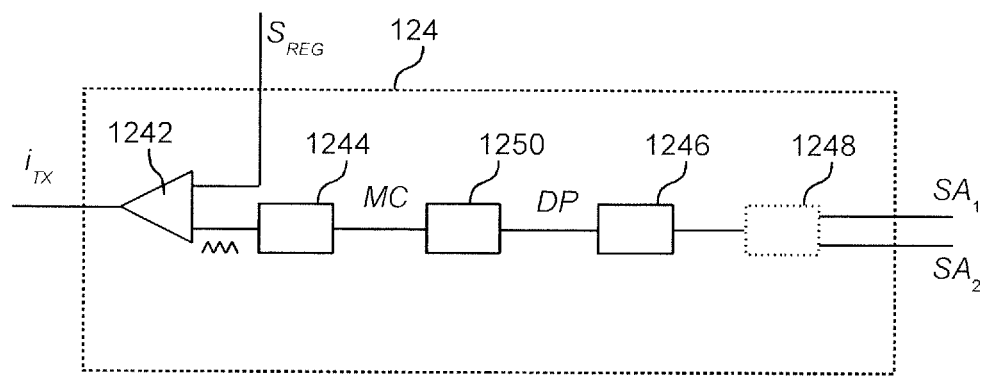
FIGS. 18 and 20 show further embodiments of a transmission circuit for a feedback circuit.

For example, FIG. 18 shows an embodiment wherein an encoder circuit 1250 is interposed between oscillator 1244 and PISO register 1246. Specifically, said encoder circuit 1250 is configured to receive at input a single bit of the DP signal, and provides at output a sequence of two bits which are set to:

"01" if the bit of signal DP has a first logical value (e.g. DP="0"); and

"10" if the bit of signal DP has a second logical value (e.g. DP="1").

Alternatively, a similar encoder circuit may be arranged between the analog-digital converter 1248 and the PISO register 1246, i.e. the bit sequence of signal DP may already be encoded with a Manchester encoding.

Therefore, the oscillator circuit 1244 receives at input a bit sequence with Manchester encoding. Preferably, also in this case the bits received at input are synchronized with the operation of the oscillator circuit 1244.

Figure 19:
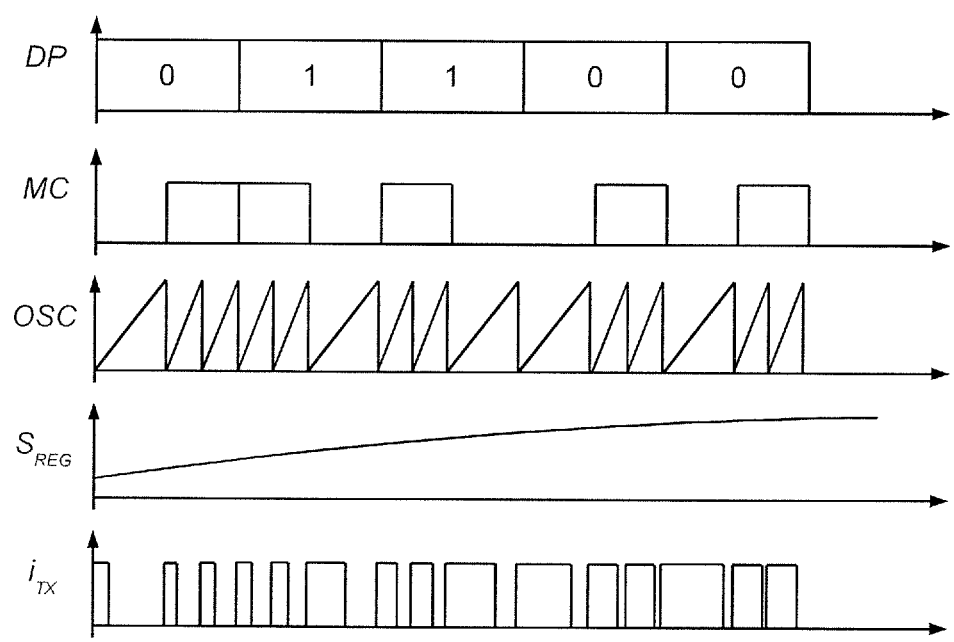
FIGS. 19 and 21 show possible waveforms of the transmission circuits of FIGS. 18 and 20.

For example, FIG. 19 shows a possible bit sequence MC for the bits of signal DP, and a corresponding signal OSC generated by the oscillator circuit 1244.

Therefore, by using a Manchester encoding, the transmitted value is negligible, because of the presence of a high-frequency ripple which will be partially filtered by the PI/PID regulator, and at any rate at such a high frequency as to avoid originating visible variations.

Generally speaking, on the primary side it is possible to use a digital or analog circuit in order to determine the duty cycle of the transmitted signal, e.g. the signal $S_{REG}$. On the other hand, as the frequency of the transmitted signal varies continuously, it is preferable to use a digital circuit (similar to what previously described with reference to FIG. 13) for the analysis of the frequency of the PWM signal.

Generally speaking, the circuits 124 shown in the FIGS. 14 and 18 may also be implemented with a digital circuit 152, configured to directly generate an analog transmission signal TX, as shown with reference to FIG. 13. This embodiment, however, has the drawback that the digital circuit, such as e.g. a microprocessor, should have a fast analog-digital converter associated thereto, and also the operating frequency of the digital circuit should be high (e.g. amounting to some MHz) in order to enable the generation of a PWM signal again.

Figure 20:
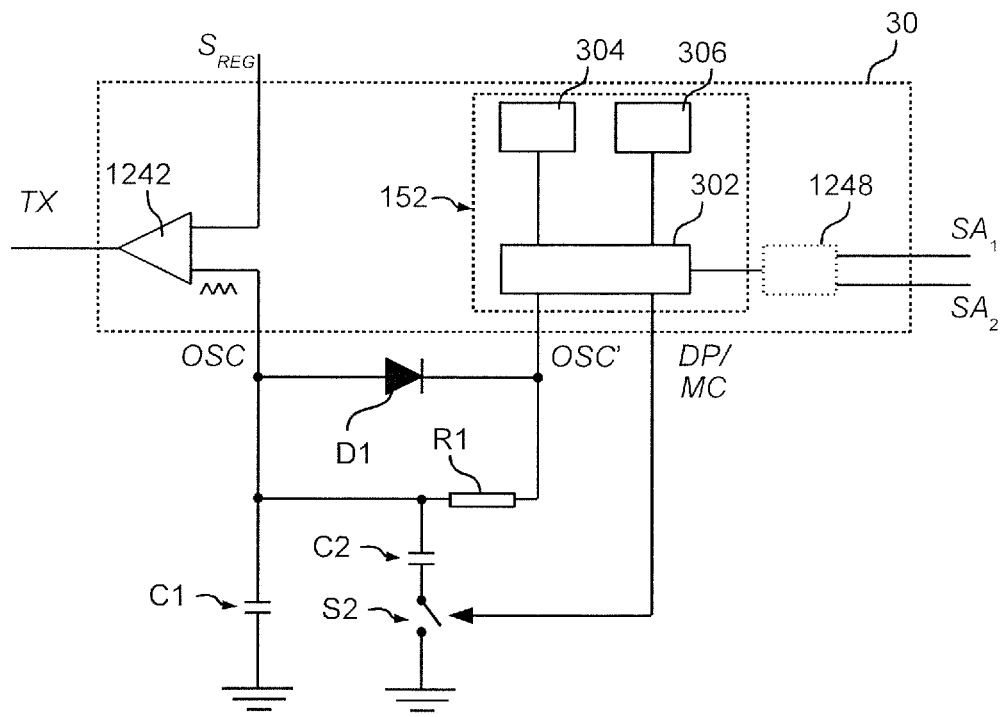

On the other hand, FIG. 20 shows a combined embodiment, which makes use of the analog components of a typical microcontroller 30 in order to implement the operation of the circuits 124 shown in FIGS. 14 and 18.

Specifically, a microcontroller 30 typically includes a microprocessor 302 and a memory 304, which contains the firmware for microprocessor 302. A microcontroller 30, moreover, often includes further dedicated hardware components, which are adapted to perform digital operations, e.g. counters/timers 306. Therefore, said components may be used in order to implement the digital circuit 152 described with reference to FIG. 13, e.g. in order to directly generate signal TX.

However, a microcontroller often additionally includes analog components, specifically an analog comparator and optionally an analog-digital converter. Therefore, such components may be used as a comparator 1242 and as an analog/digital converter 1248.

However, as stated in the foregoing, the comparator 1242 receives at input not only the signal $S_{REG}$, but also a signal OSC which has a triangular or sawtooth shape.

Figure 21:
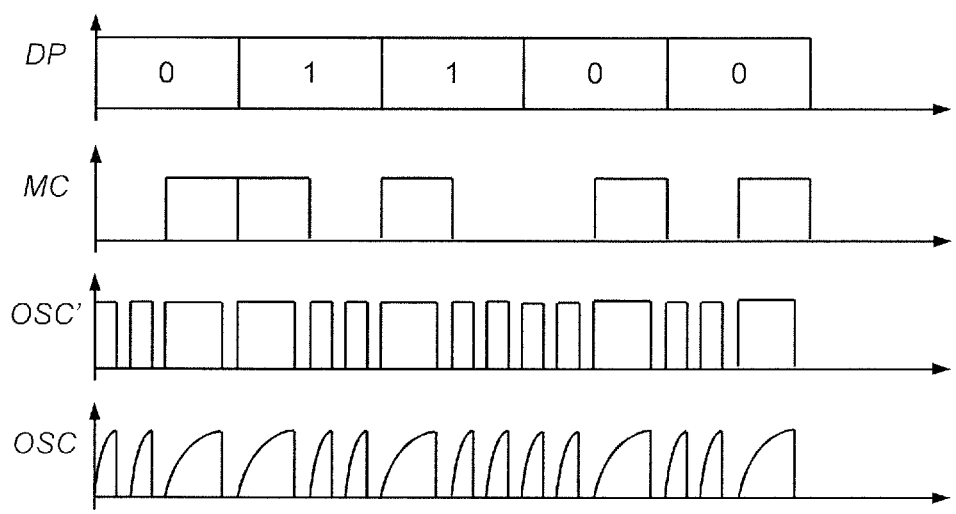

In this scenario, FIGS. 20 and 21 show a possible embodiment for generating a substantially sawtooth-shaped signal OSC.

Specifically, in the presently considered embodiment, microprocessor 302 is configured for generating two signals:
  signal DP, or preferably signal MC described in the foregoing;
  a signal OSC', wherein said signal includes:
  a) when signal DP/MC is high, a given number of pulses (e.g. one single pulse) having a first frequency, and
  b) when signal DP/MC is low, a given number of pulses (e.g. two pulses) having a second frequency, wherein the second frequency is higher than the first frequency, e.g. is twice the first frequency.

In the presently considered embodiment, signal OSC' is supplied to a filter RC including a resistor R1 and two capacitors C1 and C2, wherein capacitor C2 is selectively activatable by means of an electronic switch S2 driven by signal MC. Therefore, the output of filter RC, i.e. the voltage to capacitor C1, corresponds to signal OSC, and the signal MC is used to change the frequency of filter RC, so that:
  a) when signal DP/MC is high, filter RC has a first rising time (capacitor charging time), and
  b) when signal DP/MC is low, filter RC has a second rising time, wherein the second rising time is lower than the first rising time, e.g. half the first rising time.

If the generation of a sawtooth-shaped signal is desired, the filter additionally includes means, e.g. a diode D1, connected between signal OSC and signal OSC', which therefore enables discharging (without the intervention of resistor R1) capacitor C1 (and optionally capacitor C2) when signal OSC' is low.

Therefore, this embodiment offers the advantage that the signals DP/MC and OSC' may also be low frequency signals, while signal TX is generated by analog means, without the need of converting signal $S_{REG}$ into a digital signal.

Of course, without prejudice to the principle of the disclosure, the implementation details and the embodiments may vary, even appreciably, with respect to what has been described herein by way of non-limiting example only, without departing from the scope of the disclosure as defined by the annexed claims.

LIST OF REFERENCE SIGNS

Electronic converter 10
Input terminal 102
Output terminals 104
Filter circuit 106
Rectification circuit 108
Filter circuit 110
Switching stage 112
Rectification circuit 114
Filter circuits 116
Control circuit 118
Feedback circuit 120
Measurement circuit 122
Transmission circuit 124
Comparator 1242
Oscillator circuit 1244
Parallel-In Serial-Out register 1246
Analog-digital converter 1248
Encoder circuit 1250
Optocoupler 126
Receiver circuit 128
Regulation unit 130
Circuit for generating a reference signal 134
Sensor or receiver 136
Digital circuit 152
Driver circuit 154
Receiver circuit 156
Digital circuit 158
Lighting module 20
LED string 22
Current regulator 24
Input terminal 200
Microcontroller 30
Microprocessor 302
Memory 304
Counters/timers 306
Driver signal DRV
Regulation signal $FB_{REG}$
Output current $i_{out}$
LED L
Reference signal REF
Circuit configured to generate a pulse MS
Transformer T
Primary winding T1
Secondary winding T2
Bus voltage $V_{bus}$
Input voltage $V_{in}$
Rectified input voltage $V_{in,DC}$
Output voltage $V_{out}$

What is claimed is:

1. An electronic converter comprising:
two input terminals for receiving an input voltage;
two output terminals for providing a DC voltage or a DC current;
a transformer comprising a primary winding and a secondary winding;
a switching stage configured to selectively transfer energy from said two input terminals to said primary winding of said transformer;
a rectification and filter circuit connected between said secondary winding of said transformer and said two output terminals;
a measurement circuit configured to determine a first signal indicative of said DC voltage or said DC current provided via said output terminals;
a regulation circuit configured to generate a regulation signal as a function of said first signal and one or more reference signals;
a driver circuit configured to drive said switching stage as a function of said regulation signal;
wherein the electronic converter comprises:
an optical, inductive or capacitive coupler;
a transmission circuit configured to:
  a) receive said first signal and a second signal,
  b) generate a bit sequence indicative of said second signal,
  c) generate an encoded bit sequence by applying a Manchester coding to said bit sequence,
  d) generate a pulse width modulated signal applied to the input of said optical, inductive or capacitive coupler, wherein said pulse width modulated signal comprises for each bit of said encoded bit sequence:
    a sequence of a first number of pulses with a first frequency when the respective bit has a first logic value, and
    a sequence of a second number of pulses with a second frequency when the respective bit has a second logic value,
  e) vary the duty cycle of said pulse width modulated signal as a function of said first signal, and
a receiver circuit configured to monitor the received signal at the output of said optical, inductive or capacitive coupler, and determine a third signal indicative of said first signal and a fourth signal indicative of said second signal.

2. The electronic converter according to claim 1, wherein said pulse width modulated signal comprises for each bit of said encoded bit sequence:
a sequence of a single pulse with said first frequency when the respective bit has said first logic value, and
a sequence of two or more pulses with said second frequency when the respective bit has said second logic value, wherein said second frequency is greater then said first frequency.

3. The electronic converter according to claim 1, wherein said second frequency is a multiple of said first frequency, preferably the double.

4. The electronic converter according to claim 1, wherein said transmission circuit comprises:
an oscillator circuit configured to generate a triangular or saw-tooth signal having said first or said second frequency as a function of the bit of said encoded bit sequence; and
an analog comparator configured to generate said pulse width modulated signal by comparing said first signal with said triangular or saw-tooth signal.

5. The electronic converter according to claim 4, wherein said oscillator circuit comprises a digital circuit configured to provide:
sequentially the bits of said encoded bit sequence;
a further signal comprising square wave pulses, wherein said further signal comprises:
  a) a sequence of said first number of pulses with said first frequency when the current bit of said encoded bit sequence has said first logic value, and
  b) a sequence of said second number of pulses with said second frequency when current bit of said encoded bit sequence has said second logic value.

6. The electronic converter according to claim 4, wherein said oscillator circuit comprises a RC filter comprising at least one resistor and at least one capacitor, wherein the charge time of said at least one capacitor is variable as a function of the value of the current bit of said encoded bit sequence.

7. The electronic converter according to claim 6, wherein said RC filter comprises a first capacitor and a second capacitor selectively connectable in parallel with said first capacitor as a function of the value of the current bit of said encoded bit sequence.

8. The electronic converter according to claim 6, wherein said at least one capacitor provides said triangular or saw-tooth signal.

9. The electronic converter according to claim 8, wherein said oscillator circuit comprises a diode connected in parallel with said at least one resistor, in order to:
charge said at least one capacitor via said at least one resistor when said further signal is high, and
discharge said at least one capacitor via said diode when said further signal is low.

10. The electronic converter according to claim 1, wherein said converter is adapted to power a lighting module via said two output terminals, and wherein said second signal is provided by at least one of:
a sensor configured to detect the type of said lighting module;
a sensor configured to detect the operation state of said lighting module;
a light sensor configured to detect the ambient luminosity, or the luminosity;
a light sensor configured to detect the color of the light emitted by said lighting module;
a temperature sensor configured to detect the temperature of said electronic converter and/or of said lighting module; and
a sensor of other environmental data.

11. The electronic converter according to claim 1, wherein said electronic converter comprises a circuit configured to generate one or more of said reference signals as a function of:
said fourth signal, and
a further signal provided by said driver circuit and at least one of a sensor, a receiver, and received via a further terminal of said electronic converter.

12. The electronic converter according to claim 11, wherein said first signal is indicative of said DC current, said second signal is indicative of a maximum current, and said further signal corresponds to a dimming signal.

13. The electronic converter according to claim 1, wherein said regulation circuit is arranged on the primary side of said electronic converter and comprises:

a Proportional-Integral (PI) or Proportional-Integral-Derivative (PID) regulator configured to generate said regulation signal by comparing said first signal with a reference signal;
a comparator with hysteresis configured to generate said regulation signal by comparing said first signal with a reference signal;
a comparison circuit configured to generate said regulation signal by comparing said first signal with a first reference signal indicative of a lower threshold and with a second reference signal indicative of an upper threshold.

14. The electronic converter according to claim 1, wherein the other environmental data is an ambient temperature.

15. A lighting system comprising a lighting module and an electronic converter, said electronic converter comprising:
two input terminals for receiving an input voltage;
two output terminals for providing a DC voltage or a DC current;
a transformer comprising a primary winding and a secondary winding;
a switching stage configured to selectively transfer energy from said two input terminals to said primary winding of said transformer;
a rectification and filter circuit connected between said secondary winding of said transformer and said two output terminals;
a measurement circuit configured to determine a first signal indicative of said DC voltage or said DC current provided via said output terminals;
a regulation circuit configured to generate a regulation signal as a function of said first signal and one or more reference signals;
a driver circuit configured to drive said switching stage as a function of said regulation signal;
wherein the electronic converter comprises:
an optical, inductive or capacitive coupler;
a transmission circuit configured to:
 a) receive said first signal and a second signal,
 b) generate a bit sequence indicative of said second signal,
 c) generate an encoded bit sequence by applying a Manchester coding to said bit sequence,
 d) generate a pulse width modulated signal applied to the input of said optical, inductive or capacitive coupler, wherein said pulse width modulated signal comprises for each bit of said encoded bit sequence:
  a sequence of a first number of pulses with a first frequency when the respective bit has a first logic value, and
  a sequence of a second number of pulses with a second frequency when the respective bit has a second logic value,
 e) vary the duty cycle of said pulse width modulated signal as a function of said first signal, and
a receiver circuit configured to monitor the received signal at the output of said optical, inductive or capacitive coupler, and determine a third signal indicative of said first signal and a fourth signal indicative of said second signal.

16. The lighting device of claim 15, wherein applying a Manchester coding to the bit sequence comprises providing at the output a sequence of two bits in the encoded bit sequence for each bit in the bit sequence received at the input, the sequence of two bits provided at the output being set to:
 01 if the bit in the bit sequence received at the input has a first logic value, and
 10 if the bit in the bit sequence received at the input has a second logical value.

17. An electronic converter comprising:
two input terminals for receiving an input voltage;
two output terminals for providing a DC voltage or a DC current;
a transformer comprising a primary winding and a secondary winding;
a switching stage configured to selectively transfer energy from said two input terminals to said primary winding of said transformer;
a rectification and filter circuit connected between said secondary winding of said transformer and said two output terminals;
a measurement circuit configured to determine a first signal indicative of said DC voltage or said DC current provided via said output terminals;
a regulation circuit configured to generate a regulation signal as a function of said first signal and one or more reference signals;
a driver circuit configured to drive said switching stage as a function of said regulation signal;
wherein the electronic converter comprises:
an optical, inductive or capacitive coupler;
a transmission circuit configured to:
 a) receive said first signal and a second signal,
 b) generate a bit sequence indicative of said second signal,
 c) generate an encoded bit sequence by applying a Manchester coding to said bit sequence, wherein applying a Manchester coding to the bit sequence comprises providing at the output a sequence of two bits in the encoded bit sequence for each bit in the bit sequence received at the input, the sequence of two bits provided at the output being set to:
  01 if the bit in the bit sequence received at the input has a first logic value, and
  10 if the bit in the bit sequence received at the input has a second logical value,
 d) generate a pulse width modulated signal applied to the input of said optical, inductive or capacitive coupler, wherein said pulse width modulated signal comprises for each bit of said encoded bit sequence:
  a sequence of a first number of pulses with a first frequency when the respective bit has a first logic value, and
  a sequence of a second number of pulses with a second frequency when the respective bit has a second logic value,
 e) vary the duty cycle of said pulse width modulated signal as a function of said first signal, and
a receiver circuit configured to monitor the received signal at the output of said optical, inductive or capacitive coupler, and determine a third signal indicative of said first signal and a fourth signal indicative of said second signal.

* * * * *